United States Patent
Ryan et al.

(10) Patent No.: US 10,805,726 B1
(45) Date of Patent: Oct. 13, 2020

(54) AUDIO SYSTEM EQUALIZATION

(71) Applicant: Bose Corporation, Framingham, MA (US)

(72) Inventors: Colin Ryan, Somerville, MA (US); Joseph Gaalaas, Woodbury, MN (US); Geun Lee, Lexington, MA (US); Michael McHugh, Boston, MA (US); Nabin Sharma, Shrewsbury, MA (US); David Smith, Wellesley, MA (US); Michael Stark, Acton, MA (US); James Tracey, Norfolk, MA (US); Dmitriy Yamkovoy, Acton, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 16/542,512

(22) Filed: Aug. 16, 2019

(51) Int. Cl.
- *H03G 5/00* (2006.01)
- *H04R 3/04* (2006.01)
- *G06F 17/18* (2006.01)
- *G06F 3/16* (2006.01)

(52) U.S. Cl.
CPC ............... *H04R 3/04* (2013.01); *G06F 3/162* (2013.01); *G06F 17/18* (2013.01)

(58) Field of Classification Search
CPC ............ H04R 3/04; G06F 3/162; G06F 17/18
See application file for complete search history.

(56) References Cited

U.S. PATENT DOCUMENTS

| | | | |
|---|---|---|---|
| 6,683,962 B1 * | 1/2004 | Griesinger | H04S 1/002 381/1 |
| 7,382,888 B2 * | 6/2008 | Aylward | H04S 1/00 381/300 |
| 8,553,894 B2 | 10/2013 | Berardi et al. | |
| 2003/0179891 A1 * | 9/2003 | Rabinowitz | H04R 29/001 381/103 |
| 2007/0121964 A1 * | 5/2007 | Rumreich | H04R 3/14 381/99 |
| 2009/0245535 A1 * | 10/2009 | Van Dijk | H04R 1/403 381/99 |
| 2014/0270282 A1 * | 9/2014 | Tammi | H04R 5/02 381/300 |
| 2016/0094929 A1 * | 3/2016 | Brannmark | H04S 1/005 381/310 |
| 2016/0269828 A1 * | 9/2016 | Smith | H04R 3/007 |
| 2019/0069112 A1 * | 2/2019 | Pearson | H04R 3/005 |
| 2019/0110153 A1 * | 4/2019 | Pearson | H04S 7/305 |

* cited by examiner

*Primary Examiner* — Simon King
(74) *Attorney, Agent, or Firm* — Dingman IP Law, PC (57) ABSTRACT

An audio system with first and second discrete audio drivers that are in a listening space, wherein each driver is configured to radiate sound into the listening space, and wherein the radiated sound from each driver at a listening location in the listening space has a frequency, phase, and magnitude. The audio system is configured to modify a phase of the sound radiated by at least one of the first or second drivers such that a phase response difference between the first and second drivers at the listening location is closer to zero degrees than it was before the modification.

25 Claims, 9 Drawing Sheets

AUDIO SYSTEM EQUALIZATION

BACKGROUND

This disclosure relates to equalizing an audio system.

Destructive interference of sound from multiple audio drivers at a listening location can negatively impact the listening experience.

SUMMARY

All examples and features mentioned below can be combined in any technically possible way.

In one aspect, a computer program product having a non-transitory computer-readable medium including computer program logic encoded thereon that, when performed on an audio system comprising first and second discrete audio drivers that are in a listening space, wherein each driver is configured to radiate sound into the listening space, and wherein the radiated sound from each driver at a listening location in the listening space has a frequency, phase, and magnitude, is configured to cause the audio system to modify a phase of the sound radiated by at least one of the first or second drivers such that a phase response difference between the first and second drivers at the listening location is closer to zero degrees than it was before the modification.

Examples can include one of the above and/or below features, or any combination thereof. In some implementations, the first driver is a driver of a loudspeaker system that is configured to radiate sounds based on audio from a video signal source. In some implementations, the second driver is a driver of a subwoofer that is configured to radiate sounds based on the audio from the video signal source. In some implementations, the phase modification takes place over a crossover frequency range wherein the first and second drivers are both configured to radiate sound. In some implementations, the crossover frequency range is centered at a frequency below 300 Hertz (Hz). In some implementations, the crossover frequency range has a span of at least 0.5 octaves and at most 1.5 octaves.

Examples can include one of the above and/or below features, or any combination thereof. In some aspects, the computer program logic is further configured to cause the audio system to develop a linear fit to the phase response difference, wherein the linear fit has a slope and an origin phase value at zero frequency. In some aspects, the computer program logic is further configured to cause the audio system to bring the linear fit origin phase value closer to zero degrees. In some aspects, the computer program logic is further configured to cause the audio system to change the slope of the linear fit such that the slope become closer to zero.

Examples can include one of the above and/or below features, or any combination thereof. In some implementations, the computer program logic is further configured to cause the audio system to implement an all-pass filter that has a modifiable non-linear phase response. In some implementations, the all-pass filter is applied to only one of the first or second drivers. In some implementations, the all-pass filter comprises a second order filter with a flat magnitude response and a relatively low quality factor. In some implementations, the computer program logic is further configured to cause the audio system to modify the magnitude of the sound radiated by at least one of the first or second drivers. In some implementations, the magnitude modification occurs after the phase modification.

Examples can include one of the above and/or below features, or any combination thereof. In some implementations, the computer program logic is further configured to cause the audio system to modify the phase of the sound radiated by at least one of the first or second drivers such that a phase response difference between the first and second drivers, at a plurality of different listening locations in the listening space, is closer to zero degrees than it was before the modification. In some implementations, the computer program logic is further configured to cause the audio system to combine the modifications of the phase of the sound radiated by at least one of the first or second drivers such that a phase response difference between the first and second drivers, at a plurality of different listening locations in the listening space, is closer to zero degrees than it was before the modification. In some examples, the combination is weighted based on user input.

Examples can include one of the above and/or below features, or any combination thereof. In some implementations, the computer program logic is further configured to cause the audio system to delay the sound radiated by at least one of the first or second drivers. In some implementations, the phase modification and delay takes place over a crossover frequency range wherein the first and second drivers are both configured to radiate sound. In some implementations, the computer program logic is further configured to cause the audio system to use separate measurements of sound radiated by the first and second drivers in the crossover frequency range and received at the listening location to predict a total magnitude response at the listening location, before the phase modification. In some implementations, the computer program logic is further configured to cause the audio system to use separate measurements of sound radiated by the first and second drivers in the crossover frequency range and received at the listening location to predict a total magnitude response at the listening location, after the phase modification. In some implementations, the computer program logic is further configured to cause the audio system to predict a magnitude response improvement based on a difference between the predicted total magnitude response at the listening location after the phase modification and the predicted total magnitude response at the listening location before the phase modification, and cause phase modification only if the predicted magnitude response difference is greater than a predetermined value.

In another aspect, a method for operating an audio system comprising first and second discrete audio drivers that are in a listening space, wherein each driver is configured to radiate sound into the listening space, and wherein the radiated sound from each driver at a listening location in the listening space has a frequency, phase, and magnitude, includes modifying a phase of the sound radiated by at least one of the first or second drivers such that a phase response difference between the first and second drivers at the listening location is closer to zero degrees than it was before the modification.

Examples can include one of the above and/or below features, or any combination thereof. In some implementations, the phase modification takes place over a crossover frequency range wherein the first and second drivers are both configured to radiate sound, and the phase modification may be effected using an all-pass filter that has a modifiable non-linear phase response.

In another aspect, an audio system includes first and second discrete audio drivers that are in a listening space, wherein each driver is configured to radiate sound into the listening space, and wherein the radiated sound from each driver at a listening location in the listening space has a frequency, phase, and magnitude, and a controller that is configured to modify the phase of the sound radiated by at least one of the first or second drivers such that a phase response difference between the first and second drivers at the listening location is closer to zero degrees than it was before the modification.

Examples can include one of the above and/or below features, or any combination thereof. In some implementations, the phase modification takes place over a crossover frequency range wherein the first and second drivers are both configured to radiate sound, and the controller may be configured to effect the phase modification using an all-pass filter that has a modifiable non-linear phase response.

DETAILED DESCRIPTION

Audio systems commonly include two or more discrete loudspeakers. Each loudspeaker will have one or more audio drivers that project sound. For example, home theater systems can include a loudspeaker located with the television (which in some examples is termed a "soundbar" and that typically plays the center, right, and left channels and that in some examples radiates from about 90 Hertz (Hz) up), and a subwoofer located somewhere else in the room that in some examples radiates at from about 30 to about 300 Hz. Note that these values are illustrative of audio systems, meant to illustrate a system with a crossover region (i.e., a frequency range where both loudspeakers play sound) of from about 90 to about 300 Hz. In some cases, such systems have what is termed a "crossover point" where both loudspeakers contribute evenly to the overall sound radiation. In some examples, a crossover frequency range wherein both drivers are configured to radiate sound is centered at a frequency below 300 Hz. In some examples, the crossover frequency range has a span of at least 0.5 octaves and at most 1.5 octaves. In one non-limiting example the span is one octave. In a non-limiting example of an audio system designed to be used with a television, with a soundbar and a separate subwoofer, the crossover frequency range is centered at 110 Hz and spans 0.637 octaves.

When two audio drivers that are not co-located (i.e., are spaced apart) in a listening space each radiate sound at the same frequencies (e.g., they both radiate in the crossover region), if the sound from the drivers is not in-phase at the listening location the sound will not combine to the desired level and may combine destructively, which can negatively impact the quality of the sound heard by the listener. In the extreme, if the sounds match in level and are 180 degrees out of phase they will perfectly cancel.

To minimize this destructive interference, when the system is installed in a listening area the loudspeakers will ideally be placed such that the sound from the loudspeakers is in-phase at the listening position. However, since the audio system manufacturer will typically have no control over the relative loudspeaker placement, in-phase arrival at the listening position cannot be ensured. Audio system equalization schemes attempt to address sound cancellation-related issues by equalizing the system. System equalization can involve measuring the sound levels at several locations and adjusting the outputs of the loudspeakers to vary the magnitude at different frequencies, in an attempt to make up for partial cancellation in the crossover region. However, this type of equalization may not be perceptually ideal, as is further explained below.

Figure 1:
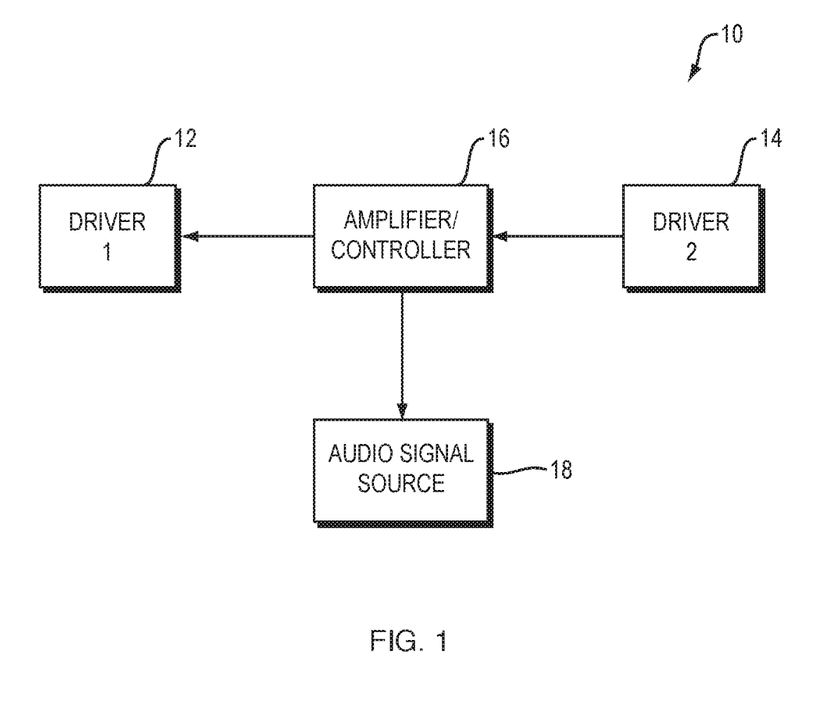
FIG. 1 is a block diagram of an audio system

FIG. 1 illustrates an audio system 10 that is configured to be equalized as described herein. Audio system 10 includes two (or more) separate (i.e., not co-located) drivers, driver 12 (labelled as driver 1) and driver 14 (labelled as driver 2). Drivers 12 and 14 are configured to radiate sound into a listening space (not shown). Amplified audio signals are provided to the drivers by amplifier/controller module 16. The one or more sources of audio signals for system 10 (which are well known in the art) are represented by audio signal source 18. In some examples, when the drivers are in a soundbar and a subwoofer used to provide sound in an audiovisual (A/V) setup (such as a television), the audio signal source 18 is the audio portion of the A/V signal.

The subject audio system equalization can be accomplished using computer program logic encoded in a non-transitory computer-readable medium (e.g., memory) that is part of module 16. Audio system 10 is configured to modify the phase of one or both of drivers 1 and 2, such that a phase response difference between the drivers at a listening location is closer to zero degrees than it was before the modification. In some examples, audio system 10 is also configured to delay the sound radiated by at least one of drivers 1 and 2. Preferably these modifications take place automatically, once any necessary measurements are conducted, as further described herein. In one non-limiting example the phase response modification and the delay can be accomplished together, for example using a single stage second-order-section (SOS) filter and a delay.

The present audio system equalization involves automated phase alignment of audio systems such as that shown in FIG. 1, with at least two discrete, non-co-located audio drivers. The equalization involves separately measuring the outputs of the drivers in the crossover frequency region. Measurements can be accomplished with a microphone whose output is communicated back to module 16. Measurements of the outputs of both drivers can be taken at one or more locations in the listening space. These isolated measurements can be used to quantify the contribution of each driver to the response heard by a listener at their listening position. A linear combination of these isolated measurements is a measure of the response of the system at the measurement position, including the cancellation at the acoustic crossover due to the phase mismatch of the wavefront arrivals.

Figure 2A:
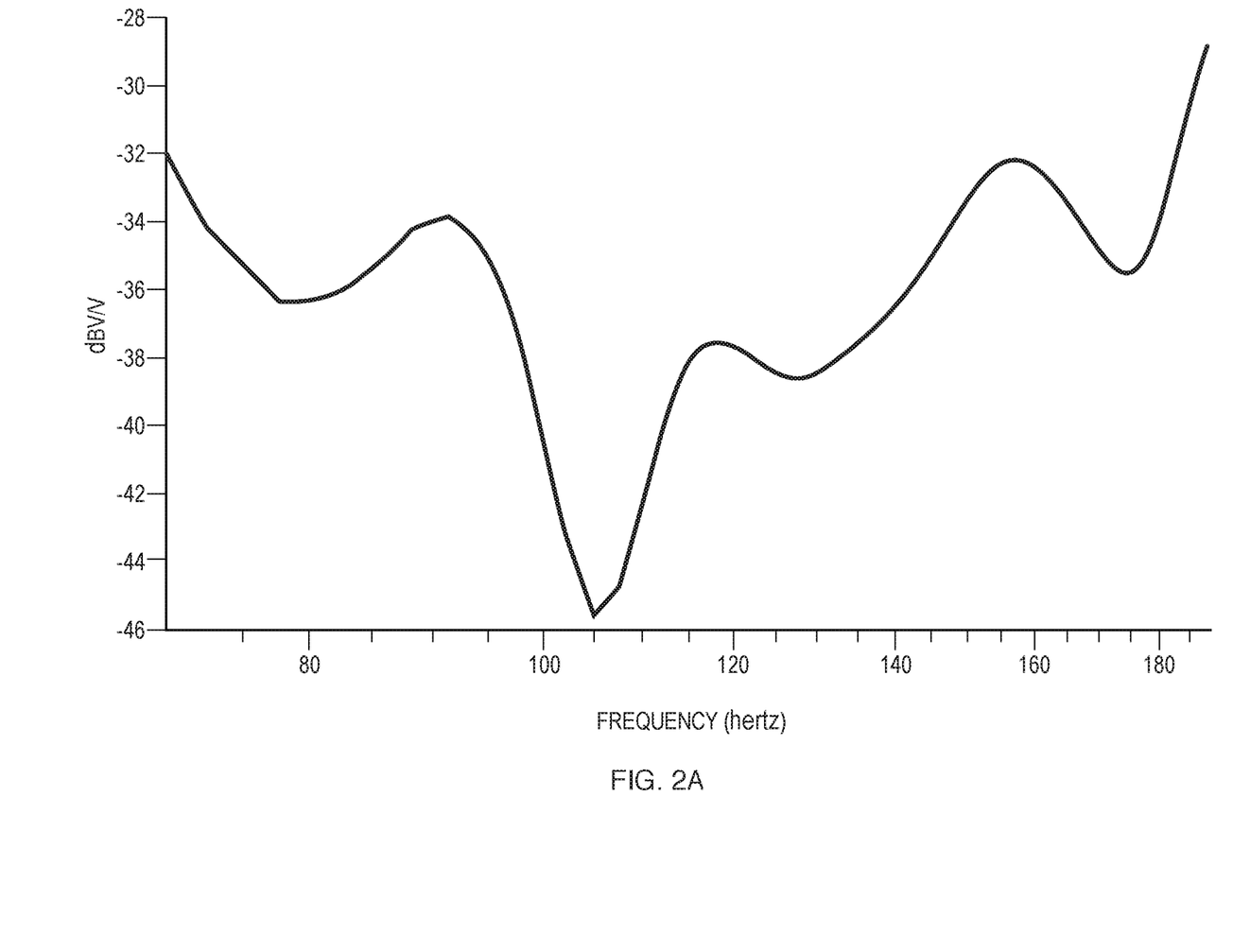
FIG. 2A illustrates a magnitude response of the audio system in a crossover region of two audio drivers radiating simultaneously.

FIG. 2A illustrates an exemplary combined magnitude response (dB vs. frequency) of two separate simultaneously-radiating audio drivers in a crossover region that spans frequencies from about 70 Hz to about 190 Hz. If the drivers are poorly aligned, some spectral components will have no energy at the listening position and no amount of traditional equalization can rectify that. More commonly, the spectrum at the measurement position is attenuated, having what are referred to as "holes" (i.e., frequencies with low magnitude, such as the relative attenuation of about 10 dB at about 105 Hz) in the sound. While artificially boosting the equalization to compensate for the acoustic cancellation can theoretically balance the spectrum for that position, the result can be perceptually unpleasant at the remaining positions that didn't suffer from a null in the spatial pattern originally. For example, certain frequencies from one driver can be too loud. Operating the audio system to accomplish proper arrival phase alignment avoids both the "no energy" case at the position of interest and prevents adding extraneous spectral boost to any of the other positions by way of an overcompensating equalization.

Figure 2B:
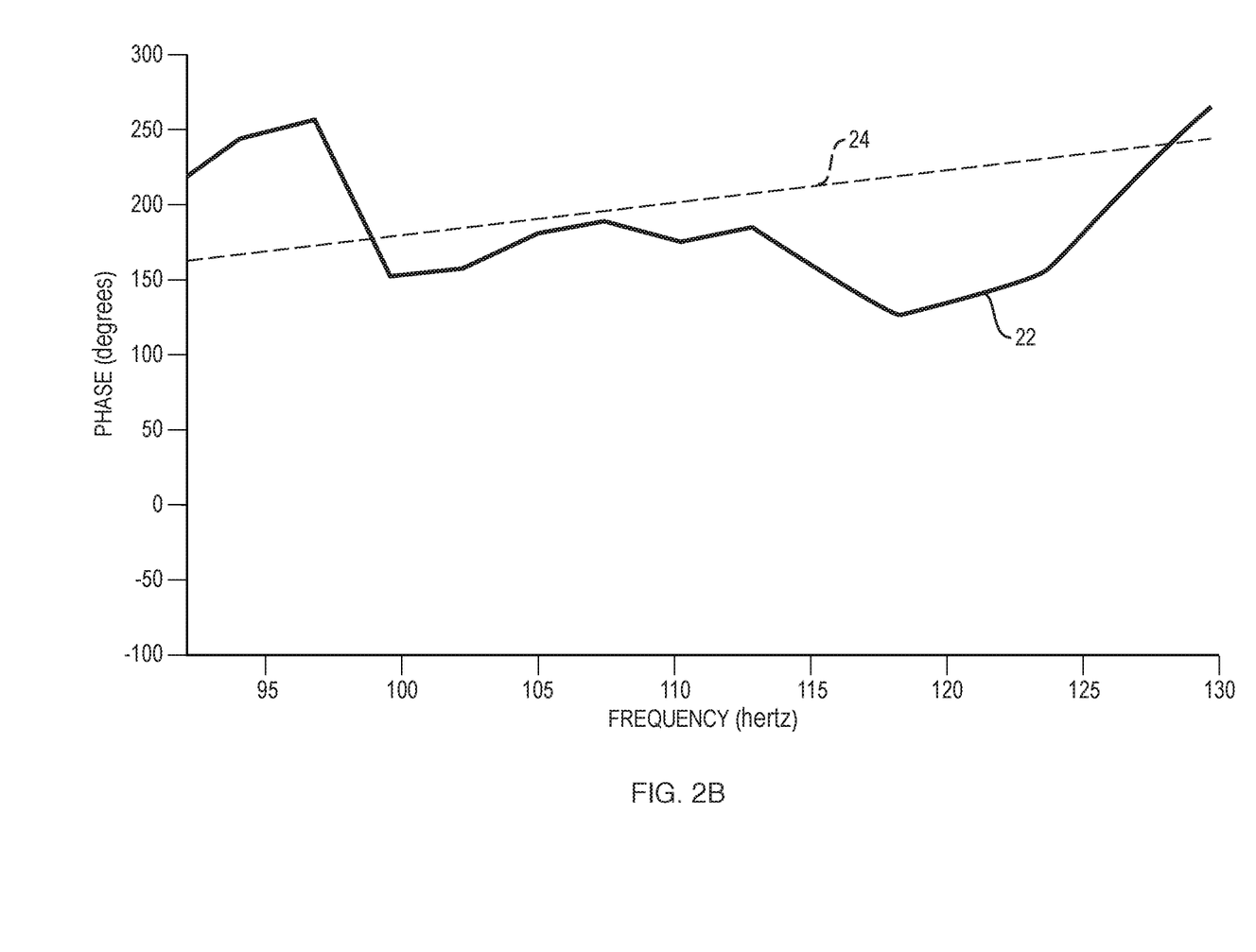
FIG. 2B illustrates a phase response difference between the two drivers in the crossover region.

The phase difference between a soundbar and a subwoofer that crossover tends to be linear in the crossover region. See, e.g., FIG. 2B which plots the phase difference (phase vs. frequency) from 90-130 Hz (solid line 22) and a linear fit to this plot (dashed line 24). A time delay between signals has a linear phase response. Since the phase response difference of the two discrete sources at the listening/measurement position is linear, the sources must be out of time alignment. Delaying one of the sources relative to the other should fix this mismatch since the linear phase mismatch was caused by a delay. However, while a delay does produce a linear phase response whose slope is determined by the delay value, the phase response of a delay element always begins at the origin of a phase-frequency graph such as shown in FIG. 2B. The y-intercept (i.e., the phase value at zero Hz) of the phase response of a pure delay is always zero. The same is typically not true for the phase difference between a soundbar and a subwoofer. While the difference tends to be linear, its y-intercept is not necessarily zero.

The slope of the phase difference between two drivers or sources can be matched by delaying one of the sources appropriately, but then the phase difference would just be a constant phase (whose value is the y-intercept of the original linear phase difference) across frequency. This sounds like an improvement, however, that constant difference could be close to 180 degrees which means the sources are perfectly out of phase across the entire crossover region. In the extreme, this phase mismatch would produce perfect cancellation across the entire range of crossover frequencies (or at least the region where the magnitudes of the two signals are effectively equal). Therefore, the y-intercept of the phase difference curve needs to be accounted for to have proper phase alignment throughout the subwoofer/soundbar crossover region. Correcting phase differences can thus be accomplished by both modifying the phase of one driver to bring the y-intercept of the phase difference curve closer to zero degrees, and delaying one driver to bring the slope of the phase difference between the drivers closer to zero.

Figure 3:
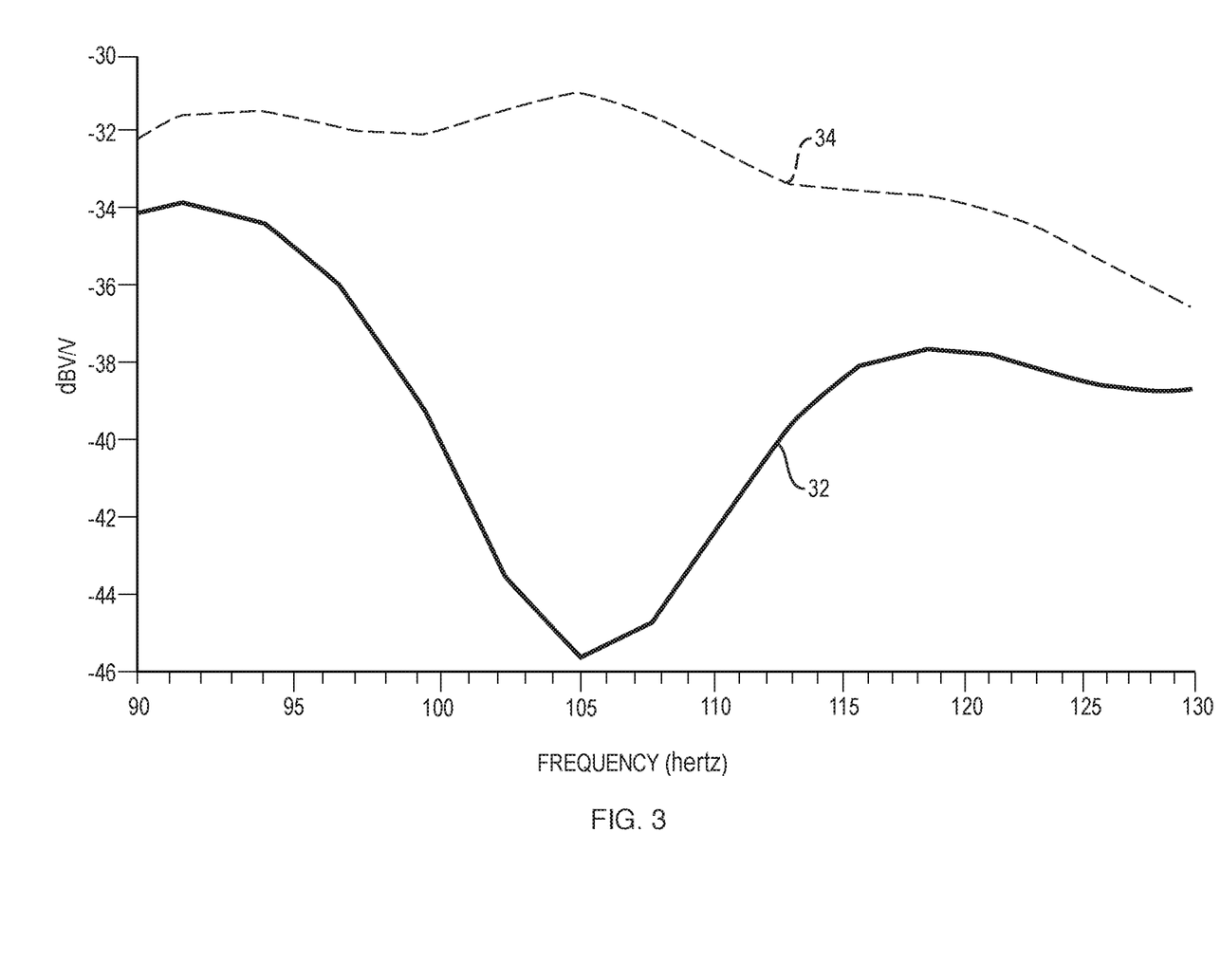
FIG. 3 illustrates the magnitude response of FIG. 2A and the magnitude response for the case where the two drivers are synthetically phase matched.

The upper bound on the magnitude response improvement from an algorithm that only manipulates phase is given by the combined magnitude response whose individual components have no phase difference. See FIG. 3, which is a plot of dB vs. frequency and includes the original magnitude response of FIG. 2A (but only at a crossover from 90-130 Hz) (solid line 32), and the same sources perfectly phase-matched (dashed line 34). This no phase difference limit can be synthesized from a data set by artificially replacing the phase response of one source (e.g. the subwoofer) with the phase response of the other source (e.g. the soundbar) in the crossover region. This ensures perfect phase match throughout the crossover band and therefore constructive reinforcement heard at the listening/measurement position. This cannot be implemented in an audio system without adding significant processing, which may not be possible given existing audio system processor limitations. However, this does provide an upper bound for the maximum improvement that an algorithm that only adjusts the phase of one driver can achieve on a given dataset.

As previously stated, a plot of the phase difference between two drivers (e.g., a soundbar and a subwoofer) vs. frequency over a crossover region tends to be generally linear, with a non-zero y-intercept. A linear fit to the data can be used to develop a truly linear plot. Since simply delaying one of the sources will influence the slope of this curve but not its y-intercept, a delay only won't necessarily compensate for the phase response mismatch. Another way to manipulate the phase response is with the addition of an all-pass filter (APF). APFs are known in the art. APFs have a flat magnitude response with a modifiable phase response. All audio signals can be passed through an APF without being attenuated, but their phase responses are reshaped by the phase response of the APF.

Unlike a pure delay, an APF's phase response is not constrained to be linear. Its shape could be described by a higher order polynomial, or some piece-wise function that would depend on the center frequency ($F_c$), quality factor (Q), sampling frequency ($F_s$), and the filter order. While the APF's phase response is non-linear across the entire audible range, an APF phase response can be approximately linear across the typical relatively narrow crossover region that has a limited frequency range, generally one octave or less. Such a linear approximation can be exploited to solve the non-zero y-intercept problem that a delay can't correct. Since the sources only have comparable magnitudes in the crossover, that is the only region where the phase compensation will produce audible results. Single stage ($2^{nd}$ order) APFs with a relatively low Q (where the Q is typically but not necessarily less than 0.5) will be linear in the crossover region. Typically, infinite impulse response (IIR) filters are implemented as a cascade of second-order-sections (SOS). A single stage SOS filter is the smallest (i.e., the least computationally intensive and with the smallest memory footprint) filter typically implemented. If the Q is kept low, any added group delay from the filter outside of the crossover region is negligible, a desirable trait of a filter that can be used to achieve the subject equalization. Exploiting APFs as a low cost constant phase-shift can achieve the desired modifications of the output of the driver(s). The subject equalization can alternatively use a more computationally complex APF, for example an APF that varies per frequency, or per frequency range, across the crossover region. For example, rather than compensating for a linear approximation of the phase difference, the equalization could compensate for a piecewise linear or higher-order approximation.

An APF can be described by its quality factor, Q, and center frequency, $F_c$ ($F_s$ will be constant and is determined by the audio system). The Q and $F_c$ parameters are preferably chosen so the response in the crossover frequencies of the subwoofer to the soundbar is approximately linear, for examples within a few degrees of linearity. This linear portion of the APF in the crossover can be fit with a $1^{st}$ order polynomial (a line). This line will have a slope, and likely a non-zero y-intercept. Also, by fixing the Q and manipulating the center frequency, a family of APFs whose phase response is linear in the crossover region and whose first order fits have y-intercepts that span 180° (or π radians) can be produced.

Figure 4A:
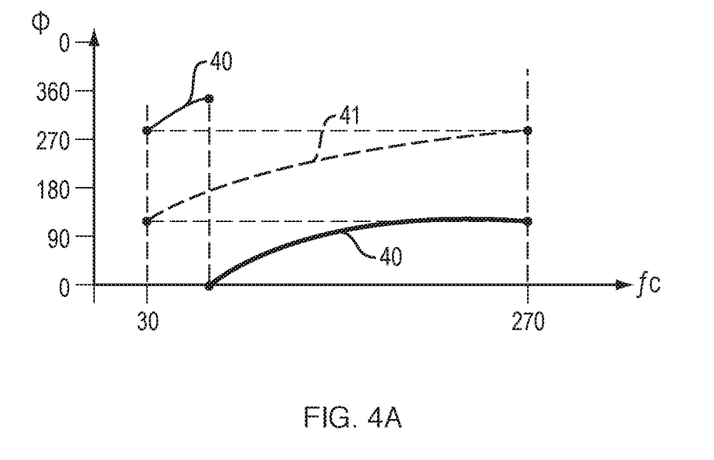
FIG. 4A illustrates Y-axis intercepts versus center frequency of all-pass filters in the crossover region.
Figure 4B:
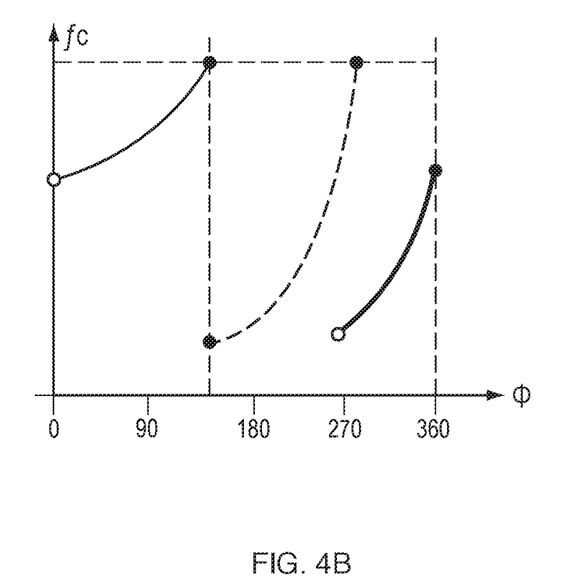
FIG. 4B is the inverse of the graph of FIG. 4A.

The APF phase response in the region of interest (the crossover region) can be approximated with a line. The y-intercept of that line is the $\Phi_0$ term of the plots of FIGS. 4A (the y axis) and 4B (the x axis). The y-intercept described here is the extrapolated y-intercept of a linear fit of a non-linear function. The APF phase response can be considered a function of the quality factor, the center frequency, and the polarity. If the Q is fixed and the center frequency is swept over a range of frequencies, the resulting y-intercept term covers a range of angles. For example, as the center frequency (the x axis in FIG. 4A) is swept over a range from just above 30 Hz to about 270 Hz, the resulting y-intercept covers a range of angles, from about 270 to about 90 degrees (solid line curve 40, FIG. 4A). Using the same range of center frequencies with the inverted polarity produces a y-intercept in the other 180 degree range, from about 90 degrees to about 270 degrees (dashed line curve 41, FIG. 4A). FIG. 4B is the same graph as FIG. 4A, but with the axes swapped.

To implement a phase correction, the inverse operation is performed. That is, for a desired y-intercept ($\Phi_0$) an appropriate center frequency and polarity are selected. FIG. 4B illustrates this relationship. The curves in the figures can be approximated with a polynomial. Or, the values can be precomputed and saved.

Figure 4C:
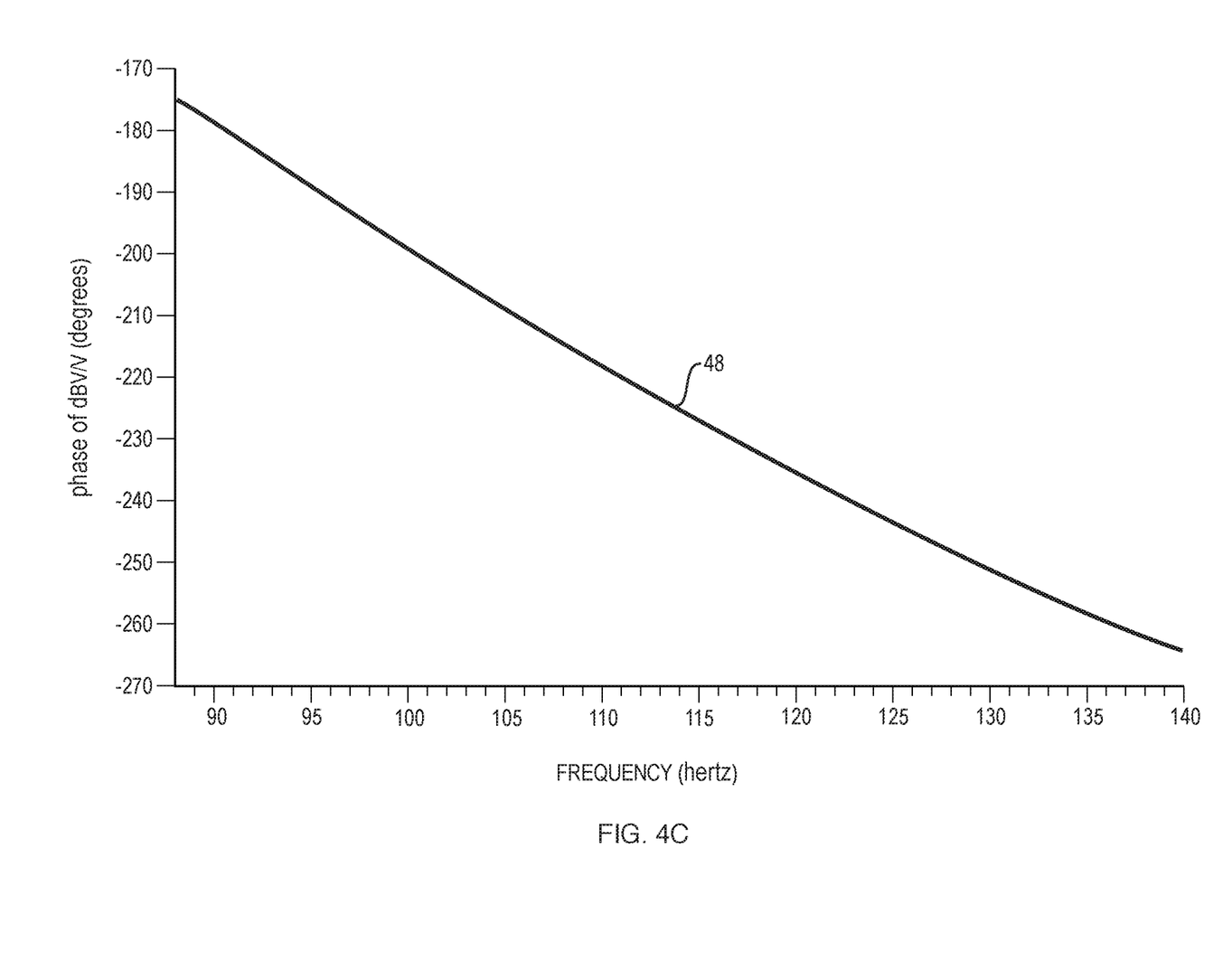
FIG. 4C illustrates the phase response of an all-pass filter in the crossover region of two drivers.

FIG. 4C illustrates the y-intercepts (phase in degrees—on the y axis) and center frequency (Hz—on the x axis) of APFs in the crossover region. The phase response of an exemplary APF with a Q of 1 and a center frequency of 90 Hz in a crossover region (from 87 to 140 Hz) is depicted by curve 48, FIG. 4C. As can be seen, the response is approximately linear over the frequency range of interest.

When two sounds are combined together (as they are at the listening position), the amplitude of the sum is attenuated by the cosine of the half-angle between the sources. In order to correct the attenuation due to phase difference in general, it is necessary to apply arbitrary constant-phase and linear-phase offsets to one or both of the sound sources. Arbitrary constant-phase offset is provided by a family of APFs, as described elsewhere herein, whose constant-phase contribution covers the entire 360 degree space. The linear-phase residual, which includes the linear-phase difference of the sound sources as well as additional linear-phase offset introduced by the aforementioned APF, is corrected by delaying one sound source relative to the other.

Figure 5A:
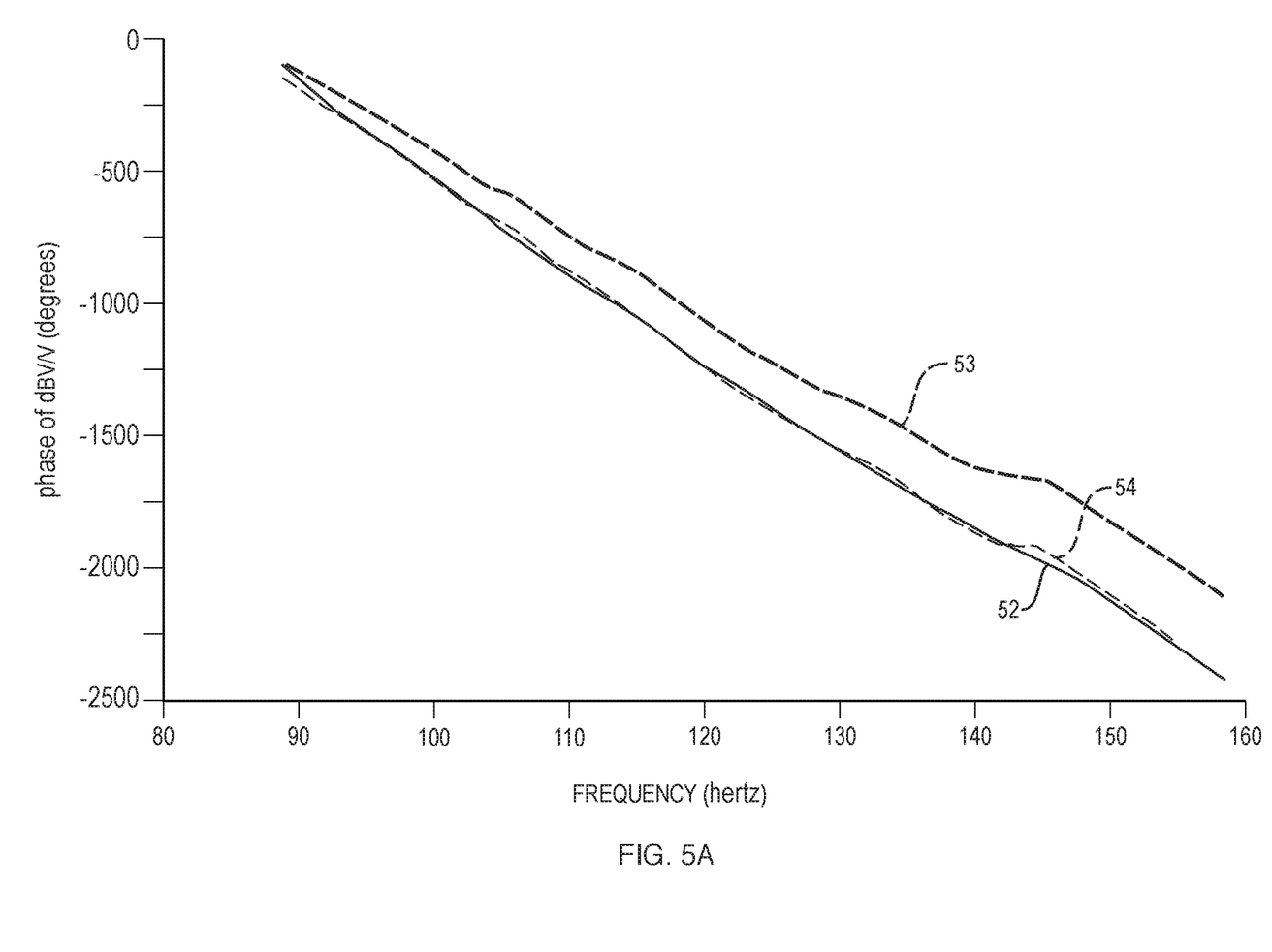
FIG. 5A illustrates uncorrected phase responses of two drivers, and a corrected phase response of one of the drivers.
Figure 5B:
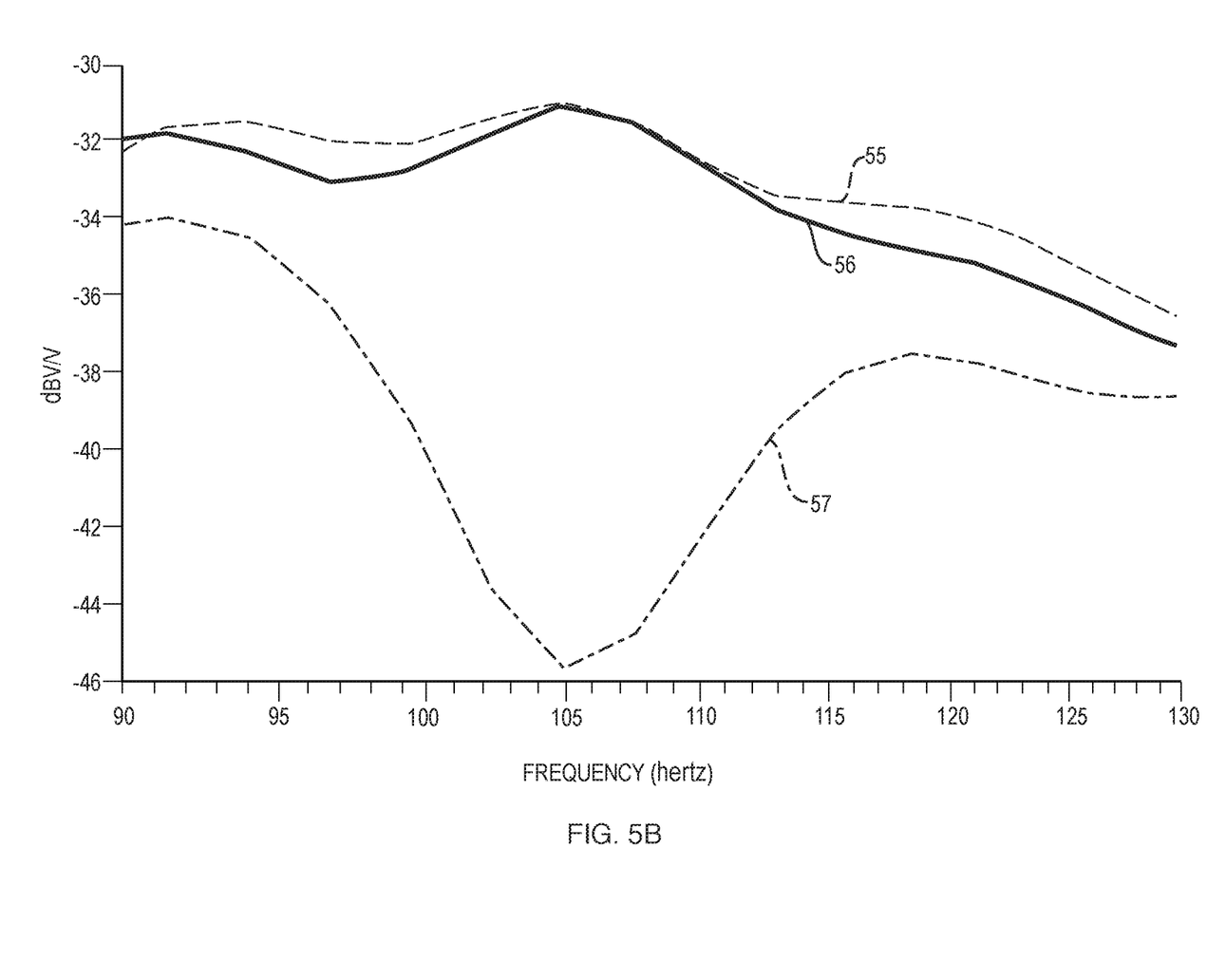
FIG. 5B illustrates a corrected magnitude response in comparison to the magnitude responses of FIG. 3.
Figure 6:
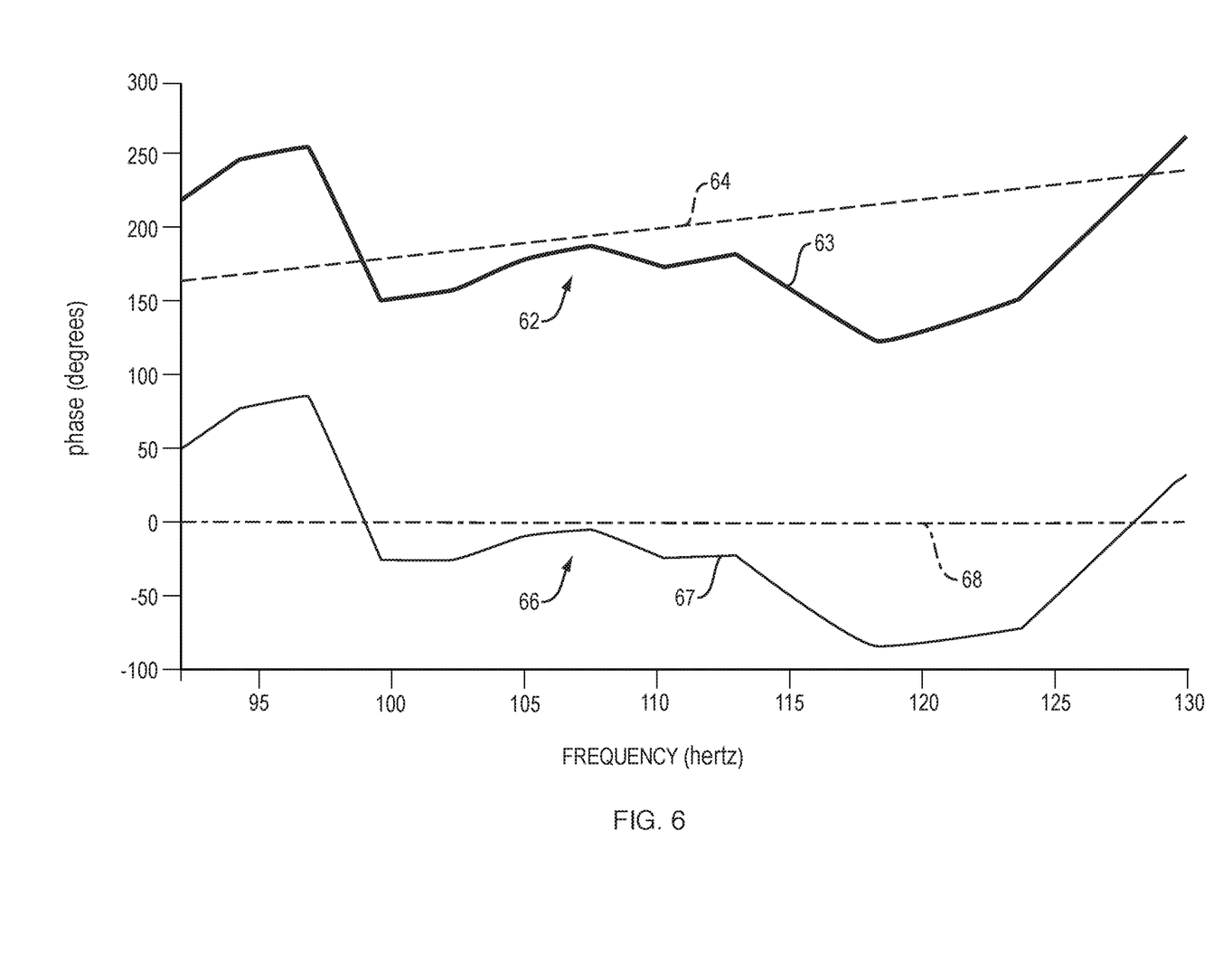
FIG. 6 illustrates a phase response difference and a linear fit to the phase response difference, before and after modification.

FIG. 5A illustrates the phase response (phase (degrees) vs. frequency (Hz)) for a soundbar (solid line 52) and a subwoofer (dashed line 53), and the subwoofer after application of the APF and delay according to this disclosure (dotted line 54). The modified subwoofer phase response almost exactly matches the phase response of the unmodified soundbar. FIG. 5B illustrates (dB vs. frequency) a post-modification magnitude response (solid line 56) which closely matches the perfectly matched magnitude response (dashed line 55) developed from the original un-modified magnitude response (dotted line 57). FIG. 6 (phase vs. frequency) includes two families of plots. The top family 62 is the data from FIG. 2B (phase response difference (solid line 63) and linear fit to the phase response difference (dashed line 64) without modification. The bottom family 66 illustrates the same two curves (phase response difference (solid line 67) and linear fit thereto (dashed line 68)) after modification as described herein. The linear fit has a slope of almost zero and a y-intercept of zero, which establishes that the algorithm performs as intended.

As stated above, keeping the Q low has the benefit of minimizing group delay. However, there is a practical lower limit for Q. If the Q is set too low, the y-intercepts of the family of APF phase responses won't span 180° regardless of $F_c$'s range. This family of APFs could potentially improve the phase response, but would translate to an incomplete solution.

The described family of APFs has one independent variable (the extrapolated y-intercept) and one dependent variable (the center frequency). Therefore, there is a polynomial that describes the relationship between the APF center frequency and the y-intercept of the linear portion of the phase response of this APF in the crossover region. Knowing this relationship enables the proper APF coefficients to be calculated on the fly during an audio system equalization that uses measurements accomplished by the user, in the listening space, without requiring some sort of dictionary/lookup table, which may require more memory than is available in the audio system.

Applying the APF can be effective to move the y-intercept or $0^{th}$ order term of the phase difference closer to zero. The y-intercept is the term that a delay alone cannot account for. The next step can be to match the slope or $1^{st}$ order term of the phase difference in the crossover region, in order to bring the slope closer to zero, and ideally to zero. The APF used to compensate for the $0^{th}$ order term has some non-zero slope of its own in the crossover region. To accurately correct for the original phase difference curve, this APF slope must be considered. The first order term to be compensated for can be directly calculated as the slope of the phase difference minus the slope of the APF in the crossover region. The combination of the y-intercept-compensating APF and the slope-compensating delay element fully correct the linear approximation of the phase difference between the subwoofer and the soundbar in the crossover region. Note that the APF and delay can both be applied to one driver, or they can be applied to different drivers. This solution is low cost since delays are cheap and a single stage SOS filter is the smallest filter that is typically implemented in practice. These algorithms for analyzing and compensating for the phase difference between two crossed-over sources offers an inexpensive, implementable and effective solution to the issue of phase mismatch across a region of frequencies.

In some examples, the APF coefficients and the delay value (as either the number of samples at the sample rate, or as a time) are saved in non-volatile memory of the audio system. When the audio system is turned on these values are loaded and used for the APF and the delay. In different examples these values are stored locally in each speaker device, at only one of the speaker devices (e.g., a master device, such as a soundbar), at a controller (e.g., a console device), or in the cloud (e.g., linked to a user's account associated with the speaker devices).

The modifications can be based on a single location—typically the preferred listening location. Alternatively, the modifications can be based on measurements taken at more than one location in the listening area, in which case the APF and delay would likely be based on some combination (e.g., an average) of the modifications calculated for each measured position. The combination of calculated modifications at multiple locations can be accomplished automatically, or can be based on user input (e.g., by instructing the user to sit in one or more favored room locations when the measurements are taken). As one non-limiting example, a combined APF and delay can be based on calculations for multiple positions, but weighted based on location. For example, the preferred listening location (as identified by the user) could be weighted more than other locations.

The subject equalization scheme can also include another feature which can help to ensure that the benefits of implementing this correction outweigh the risks. With two drivers that are not collocated but are playing the same content, the sound produced from the closer source will reach the listener first. Small differences in arrival time may be imperceptible but the delay can potentially be sufficiently long such that a listener can discern one of the speakers leading or lagging with respect to the other. Any discernable delay should be avoided. The placement of the soundbar and subwoofer (or any two drivers that aren't physically attached) is unconstrained. This means that listeners can experience a different severity of arrival time mismatch (which is ideally unperceivable) in addition to the destructive effects on the magnitude response due to phase misalignment. Adding a delay to compensate for the phase misalignment doesn't guarantee that the arrival time mismatch between the two drivers is being reduced in every scenario, so adding any delay inherently introduces the risk of making one driver audibly lead or lag the other driver.

In order to address this potentially unacceptable arrival time mismatch, the audio system equalization algorithm can be configured to compute a so-called cost-benefit analysis on the predicted improvement in the magnitude response. The cost function can be measured as a mean improvement in decibels (dB) vs delay added in milliseconds. The initial, uncorrected magnitude response at the listening position is predicted from separate measurements of the outputs of the two drivers at the listening position. System 10, FIG. 1, can accomplish these separate measurements by separately playing audio from the soundbar and the subwoofer when a user at a listening position has a microphone that communicates back to the system. Applying the intended correction (delay and APF) to the isolated measurement of one driver provides a prediction of what this driver's measured response would be, post-modification. The improvement is the difference between the initial magnitude response and the corrected magnitude response. That improved response is analyzed in a statistical sense (e.g., using an average of the improvement responses across the crossover range, or using quartile statistics) to determine a metric that accurately and succinctly quantifies the audible difference heard at the listening position.

The cost function can be tuned so that if there is a significant risk of the correction causing one driver to lead or lag there is a guarantee of some amount of average improvement throughout magnitude response in the crossover. This ensures that any difference the user hears is an improvement, and if it's predicted that implementing the correction could introduce audible degradations then the delay and the APF can simply not be used.

Having phase alignment prior to calculating a correction equalization avoids both the "no energy" case at the position of interest and prevents the equalization from adding extraneous spectral boost to any of the other positions which would produce undesirable perceptual effects. Energy can be regained in the crossover region by simply adding a single stage APF and delaying the output of a driver by some small amount of time. The computational complexity for finding the APF and optimal delay is low and does not need to be part of the real time audio rendering process. There is thus little to no impact on the processing and memory usage of the audio system since the APF order is low and the allowable delay values are constrained by a human's high sensitivity to time alignment mismatch.

Elements of FIG. 1 are shown and described as discrete elements in a block diagram. In some examples, these are implemented as one or more of analog circuitry or digital circuitry. Alternatively, or additionally, in some examples they are implemented with one or more microprocessors executing software instructions. The software instructions in some examples include digital signal processing instructions. In some examples, operations are performed by analog circuitry or by a microprocessor executing software that performs the equivalent of the analog operation. In some examples, signal lines are be implemented as discrete analog or digital signal lines, as a discrete digital signal line with appropriate signal processing that is able to process separate signals, and/or as elements of a wireless communication system.

When processes are represented or implied in the block diagram, in some examples the steps are performed by one element or a plurality of elements. In some examples, the steps are performed together, or at different times. In some examples, the elements that perform the activities are physically the same or proximate one another. Alternatively, they are physically separate. In some examples, one element performs the actions of more than one block. Audio signals are encoded, or not. Audio signals are transmitted in either digital or analog form. Conventional audio signal processing equipment and operations are in some cases omitted from the drawing.

Examples of the systems and methods described herein comprise computer components and computer-implemented steps that will be apparent to those skilled in the art. For example, it should be understood by one of skill in the art that in some examples the computer-implemented steps may be stored as computer-executable instructions on a computer-readable medium such as, for example, floppy disks, hard disks, optical disks, Flash ROMS, nonvolatile ROM, and RAM. Furthermore, it should be understood by one of skill in the art that in some examples the computer-executable instructions are executed on a variety of processors such as, for example, microprocessors, digital signal processors, gate arrays, etc. For ease of exposition, not every step or element of the systems and methods described above is described herein as part of a computer system, but those skilled in the art will recognize that in some examples each step or element has a corresponding computer system or software component. Such computer system and/or software components are therefore enabled by describing their corresponding steps or elements (that is, their functionality), and are within the scope of the disclosure.

A number of implementations have been described. Nevertheless, it will be understood that additional modifications may be made without departing from the scope of the inventive concepts described herein, and, accordingly, other examples are within the scope of the following claims.

What is claimed is:

1. A computer program product having a non-transitory computer-readable medium including computer program logic encoded thereon that, when performed on an audio system comprising first and second discrete audio drivers that are in a listening space, wherein each driver is configured to radiate sound into the listening space, and wherein the radiated sound from each driver at a listening location in the listening space has a frequency, phase, and magnitude, is configured to cause the audio system to:

modify a phase of the sound radiated by at least one of the first or second drivers such that a phase response difference between the first and second drivers at the listening location is closer to zero degrees than it was before the modification; and develop a linear fit to the phase response difference, wherein the linear fit has a slope and an origin phase value.

2. The computer program product of claim 1, wherein the first driver is a driver of a loudspeaker system that is configured to radiate sounds based on audio from a video signal source.

3. The computer program product of claim 2, wherein the second driver is a driver of a subwoofer that is configured to radiate sounds based on the audio from the video signal source.

4. The computer program product of claim 1, wherein the phase modification takes place over a crossover frequency range wherein the first and second drivers are both configured to radiate sound.

5. The computer program product of claim 4, wherein the crossover frequency range is centered at a frequency below 300 Hertz (Hz).

6. The computer program product of claim 4, wherein the crossover frequency range has a span of at least 0.5 octaves and at most 1.5 octaves.

7. The computer program product of claim 1, wherein the computer program logic is further configured to cause the audio system to bring the linear fit origin phase value closer to zero degrees.

8. The computer program product of claim 7, wherein the computer program logic is further configured to cause the audio system to change the slope of the linear fit such that the slope become closer to zero.

9. The computer program product of claim 1, wherein the computer program logic is further configured to cause the audio system to implement an all-pass filter that has a modifiable non-linear phase response.

10. The computer program product of claim 9, wherein the all-pass filter is applied to only one of the first or second drivers.

11. The computer program product of claim 9, wherein the all-pass filter comprises a second order filter with a flat magnitude response and a relatively low quality factor.

12. The computer program product of claim 1, wherein the computer program logic is further configured to cause the audio system to modify the magnitude of the sound radiated by at least one of the first or second drivers.

13. The computer program product of claim 12, wherein the magnitude modification occurs after the phase modification.

14. The computer program product of claim 1, wherein the computer program logic is further configured to cause the audio system to modify the phase of the sound radiated by at least one of the first or second drivers such that a phase response difference between the first and second drivers, at a plurality of different listening locations in the listening space, is closer to zero degrees that it was before the modification.

15. The computer program product of claim 14, wherein the computer program logic is further configured to cause the audio system to combine the modifications of the phase of the sound radiated by at least one of the first or second drivers such that a phase response difference between the first and second drivers, at a plurality of different listening locations in the listening space, is closer to zero degrees that it was before the modification.

16. The computer program product of claim 15, wherein the combination is weighted based on user input.

17. The computer program product of claim 1, wherein the computer program logic is further configured to cause the audio system to delay the sound radiated by at least one of the first or second drivers.

18. The computer program product of claim 17, wherein the phase modification and delay take place over a crossover frequency range wherein the first and second drivers are both configured to radiate sound, and wherein the computer program logic is further configured to cause the audio system to use separate measurements of sound radiated by the first and second drivers in the crossover frequency range and received at the listening location to predict a total magnitude response at the listening location, before the phase modification.

19. The computer program product of claim 18, wherein the computer program logic is further configured to cause the audio system to use separate measurements of sound radiated by the first and second drivers in the crossover frequency range and received at the listening location to predict a total magnitude response at the listening location, after the phase modification.

20. The computer program product of claim 19, wherein the computer program logic is further configured to cause the audio system to predict a magnitude response improvement based on a difference between the predicted total magnitude response at the listening location after the phase modification and the predicted total magnitude response at the listening location before the phase modification, and cause phase modification only if the predicted magnitude response difference is greater than a predetermined value.

21. An audio system, comprising:

first and second discrete audio drivers that are in a listening space, wherein each driver is configured to radiate sound into the listening space, and wherein the radiated sound from each driver at a listening location in the listening space has a frequency, phase, and magnitude; and a controller that is configured to modify a phase of the sound radiated by at least one of the first or second drivers such that a phase response difference between the first and second drivers at the listening location is closer to zero degrees than it was before the modification, wherein the phase modification takes place over a crossover frequency range wherein the first and second drivers are both configured to radiate sound, and wherein the controller is configured to effect the phase modification using an all-pass filter that has a modifiable non-linear phase response.

22. The audio system of claim 21, wherein the controller is further configured to cause the audio system to develop a linear fit to the phase response difference, wherein the linear fit has a slope and an origin phase value at zero frequency.

23. A computer program product having a non-transitory computer-readable medium including computer program logic encoded thereon that, when performed on an audio system comprising first and second discrete audio drivers that are in a listening space, wherein each driver is configured to radiate sound into the listening space, and wherein the radiated sound from each driver at a listening location in the listening space has a frequency, phase, and magnitude, is configured to cause the audio system to:

modify a phase of the sound radiated by at least one of the first or second drivers such that a phase response difference between the first and second drivers at the listening location is closer to zero degrees than it was before the modification; and cause the audio system to modify the magnitude of the sound radiated by at least one of the first or second drivers, wherein the magnitude modification occurs after the phase modification.

24. The computer program product of claim 23, wherein the phase modification takes place over a crossover frequency range wherein the first and second drivers are both configured to radiate sound, wherein the crossover frequency range has a span of at least 0.5 octaves and at most 1.5 octaves.

25. An audio system, comprising:
- first and second discrete audio drivers that are in a listening space, wherein each driver is configured to radiate sound into the listening space, and wherein the radiated sound from each driver at a listening location in the listening space has a frequency, phase, and magnitude; and
- a controller that is configured to modify a phase of the sound radiated by at least one of the first or second drivers such that a phase response difference between the first and second drivers at the listening location is closer to zero degrees than it was before the modification, wherein the controller is further configured to cause the audio system to develop a linear fit to the phase response difference, wherein the linear fit has a slope and an origin phase value at zero frequency.

* * * * *